(12) United States Patent
Takeuchi (10) Patent No.: US 10,088,787 B1
(45) Date of Patent: Oct. 2, 2018

(54) FIXING DEVICE

(71) Applicant: Brother Kogyo Kabushiki Kaisha, Nagoya-shi, Aichi-ken (JP)

(72) Inventor: Kenji Takeuchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/904,512

(22) Filed: Feb. 26, 2018

(30) Foreign Application Priority Data

Mar. 7, 2017 (JP) ................. 2017-043214

(51) Int. Cl.
*G03G 15/20* (2006.01)
*F16H 25/18* (2006.01)
*F16H 25/16* (2006.01)

(52) U.S. Cl.
CPC .......... *G03G 15/2089* (2013.01); *F16H 25/16* (2013.01); *F16H 25/18* (2013.01); *G03G 15/2053* (2013.01); *G03G 2215/2006* (2013.01); *G03G 2215/2009* (2013.01)

(58) Field of Classification Search
CPC ........... G03G 15/2053; G03G 15/2089; G03G 2215/2009; G03G 2215/2006; F16H 25/16; F16H 25/18
See application file for complete search history.

(56) References Cited

U.S. PATENT DOCUMENTS

| | | | |
|---|---|---|---|
| 7,519,320 | B2 | 4/2009 | Aoki et al. |
| 2007/0098465 | A1 | 5/2007 | Aoki et al. |
| 2010/0266307 | A1* | 10/2010 | Kagawa ............. G03G 15/2035 399/70 |
| 2012/0155931 | A1* | 6/2012 | Ando ................. G03G 15/2032 399/328 |
| 2015/0093164 | A1* | 4/2015 | Tanaka ............... G03G 15/2017 399/329 |
| 2015/0261150 | A1* | 9/2015 | Hasegawa .......... G03G 15/2039 399/69 |
| 2016/0349682 | A1* | 12/2016 | Takeda ............... G03G 15/2064 |
| 2016/0349684 | A1* | 12/2016 | Tanaka ............... G03G 15/2089 |

FOREIGN PATENT DOCUMENTS

| | | |
|---|---|---|
| JP | -106-035351 A | 2/1994 |
| JP | 2007-121932 A | 5/2007 |
| JP | 2008-090172 A | 4/2008 |
| JP | 2010-156818 A | 7/2010 |
| JP | 2011-133502 A | 7/2011 |

* cited by examiner

*Primary Examiner* — Francis C Gray
(74) *Attorney, Agent, or Firm* — Banner & Witcoff, Ltd.

(57) ABSTRACT

A fixing device includes a first pressure structure, a second pressure structure, a fixing member, a first arm, a second arm, and an elastic member. The fixing member is disposed between the first and second pressure structures. The first arm is pivotable about a first shaft and includes a first pressing portion and a first connection portion. The second arm is pivotable about a second shaft and includes a second pressing portion and a second connection portion. The elastic member biases the first and second pressing portions toward each other. A first leverage ratio of a distance between the first shaft and the first connection portion to a distance between the first shaft and the first pressing portion is different from a second leverage ratio of a distance between the second shaft and the second connection portion to a distance between the second shaft and the second pressing portion.

12 Claims, 8 Drawing Sheets

FIXING DEVICE

CROSS-REFERENCE TO RELATED APPLICATION

This application claims priority from Japanese Patent Application No. 2017-043214 filed on Mar. 7, 2017, the content of which is incorporated herein by reference in its entirety.

FIELD OF DISCLOSURE

The present disclosure relates to a fixing device.

BACKGROUND

JP 2011-133502A discloses an externally-heating fixing device. The externally-heating fixing device directly heats the outer surface of a heating roller or a heating film. Specifically, the fixing device heats a fixing roller at a heating nip defined by the fixing roller and a heater, and fixes a toner image to a sheet at a pressure nip defined by the fixing roller and a pressure roller.

More specifically, the externally-heating fixing device includes a rotatable heater arm, a rotatable pressure roller arm, and a spring. The heater arm supports the heater. The pressure roller arm supports the pressure roller. The spring connects the heater arm and the pressure roller arm to each other. When the spring biases the heater arm and the pressure roller arm toward each other, the heater is pressed onto the fixing roller, forming the heating nip, and the pressure roller is pressed onto the fixing roller, forming the pressure nip. In the externally-heating fixing device, the heater arm and the pressure roller have the same leverages, and therefore the heating nip and the pressure nip have the same pressing forces.

SUMMARY

Sometimes, the pressing force of the heating nip and the pressing force of the pressure nip need to be different from each other depending on desired heat fixity and/or other considerations. One possible approach is to use one spring to bias the heater arm and to use another spring of a different pressing force to bias the pressure roller arm. This approach, however, may increase the number of parts required.

Illustrative aspects of the disclosure provide a fixing device including two nips and having a simple structure that allows varying of pressing forces of two nips.

According to an aspect of the disclosure, a fixing device includes a first pressure structure, a second pressure structure, a fixing member disposed between the first pressure structure and the second pressure structure, a heater configured to heat the fixing member, a first arm, a second arm, and an elastic member. The first arm is pivotable about a first shaft and includes a first pressing portion configured to press the first pressure structure toward the fixing member and a first connection portion disposed opposite to the first shaft across the first pressing portion. The second arm is pivotable about a second shaft and includes a second pressing portion configured to press the second pressure structure toward the fixing member and a second connection portion disposed opposite to the second shaft across the second pressing portion. The elastic member is connected to the first connection portion and the second connection portion and configured to bias the first pressing portion and the second pressing portion toward each other. A first leverage ratio of a distance between the first shaft and the first connection portion to a distance between the first shaft and the first pressing portion is different from a second leverage ratio of a distance between the second shaft and the second connection portion to a distance between the second shaft and the second pressing portion.

This structure allows varying of pressing forces of two nips.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

First Embodiment

The first embodiment of the present disclosure will be described in detail below by referring to the accompanying drawings. In the following description, a general arrangement of a color printer 1 will be first described, and then features of the embodiments will be detailed.

The directions referred to in the following description are identical to the directions illustrated in FIG. 1. Specifically, the rightward direction in FIG. 1 will be assumed "front", the leftward direction in FIG. 1 will be assumed "rear", the direction perpendicular to and away from the paper surface of FIG. 1 will be assumed "left", and the direction opposite to the left will be assumed "right". The upward direction in FIG. 1 will be assumed "top", and the downward direction in FIG. 1 will be assumed "bottom".

Figure 1:
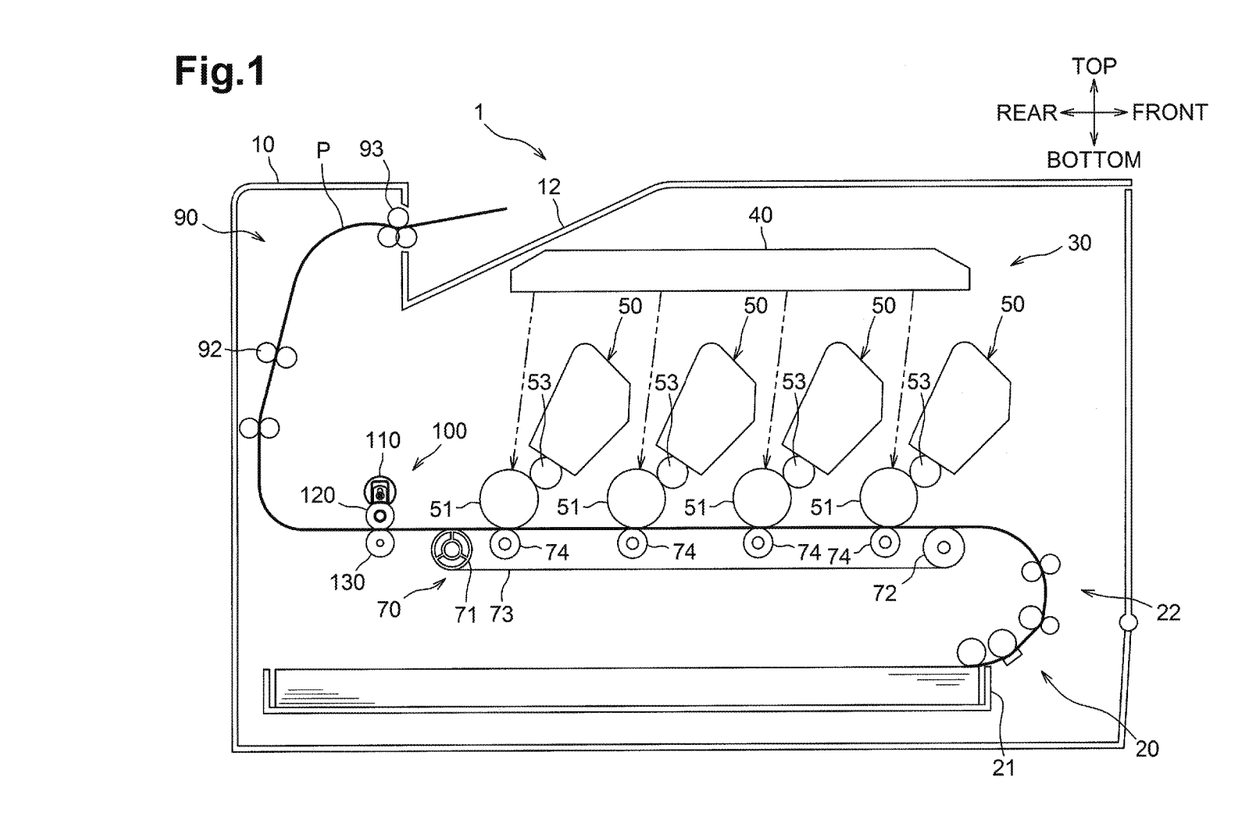
FIG. 1 is a simplified cross-sectional view of a color printer provided with a fixing device according to a first embodiment of the present disclosure.

As illustrated in FIG. 1, the color printer 1 includes a housing 10, a sheet feeder 20, an image forming unit 30, and a discharge unit 90. The housing 10 accommodates the sheet feeder 20, the image forming unit 30, and the discharge unit 90. The sheet feeder 20 supplies a sheet P, which is a non-limiting example of the sheet recited in the appended claims. The image forming unit 30 forms an image onto the sheet P that has been supplied.

The sheet feeder 20 includes a feeding tray 21 and a sheet conveying mechanism 22. The feeding tray 21 stores sheets P, and the sheet conveying mechanism 22 conveys a sheet P from the feeding tray 21 to the image forming unit 30.

The image forming unit 30 includes a scanner unit 40, four process cartridges 50, a transfer unit 70, and a fixing device 100.

The scanner unit 40 is disposed at an upper portion in the housing 10, and includes elements not illustrated such as a laser emitter, a polygon mirror, at least one lens, and at least one reflecting mirror. With this configuration, the scanner unit 40 radiates laser beams to the surfaces of photosensitive drums 51 by high-speed scanning.

The process cartridges 50 are disposed above the sheet feeder 20 and arranged in the front and rear directions. Each process cartridge 50 includes a photosensitive drum 51, a developing roller 53, and other elements not illustrated such as a charger and a toner chamber.

The transfer unit 70 is disposed between the sheet feeder 20 and the four process cartridges 50, and includes a driving roller 71, an idler roller 72, a conveyance belt 73, and four transfer rollers 74.

The driving roller 71 and the idler roller 72 are parallel to each other and spaced apart from each other in the front and rear directions. The conveyance belt 73 is a seamless belt looped across the driving roller 71 and the idler roller 72. In the loop of the conveyance belt 73, the four transfer rollers 74 are disposed and paired with the respective photosensitive drums 51 across the conveyance belt 73.

The fixing device 100 is disposed at a rear side of the four process cartridges 50 and the transfer unit 70. The fixing device 100 includes a heating unit 110, a fixing roller 120, and a pressure roller 130. The heating unit 110 is a non-limiting example of the first pressure structure and the heating member recited in the appended claims. The fixing roller 120 is a non-limiting example of the fixing member recited in the appended claims. The pressure roller 130 is a non-limiting example of the second pressure structure and the pressure member recited in the appended claims.

In the image forming unit 30, the above-mentioned chargers, not illustrated, uniformly charge the surfaces of the respective photosensitive drums 51 while the photosensitive drums 51 are rotating. The scanner unit 40 radiates the laser beams to the surfaces of the respective photosensitive drums 51 to expose the surfaces of the photosensitive drums 51. Thus, an electrostatic latent image that is based on image data is formed on the surface of each photosensitive drum 51.

Next, each developing roller 53 is driven into rotation to supply toner, which is a developing agent, to the electrostatic latent image on a corresponding photosensitive drum 51. Thus, a developing agent image is formed on the surface of the photosensitive drum 51. Then, the sheet P supplied from the sheet feeder 20 is conveyed between each pair of photosensitive drum 51 and transfer roller 74. Thus, developing agent images on the respective photosensitive drums 51 are successively transferred and overlaid one above another onto the sheet P. Next, the fixing device 100 fixes the developing agent images on the sheet P by heating.

The discharge unit 90 includes second conveyance rollers 92 and discharge rollers 93. The sheet P is discharged to the outside of the housing 10 through the second conveyance rollers 92 and the discharge rollers 93, and is placed onto the discharge tray 12.

Figure 2:
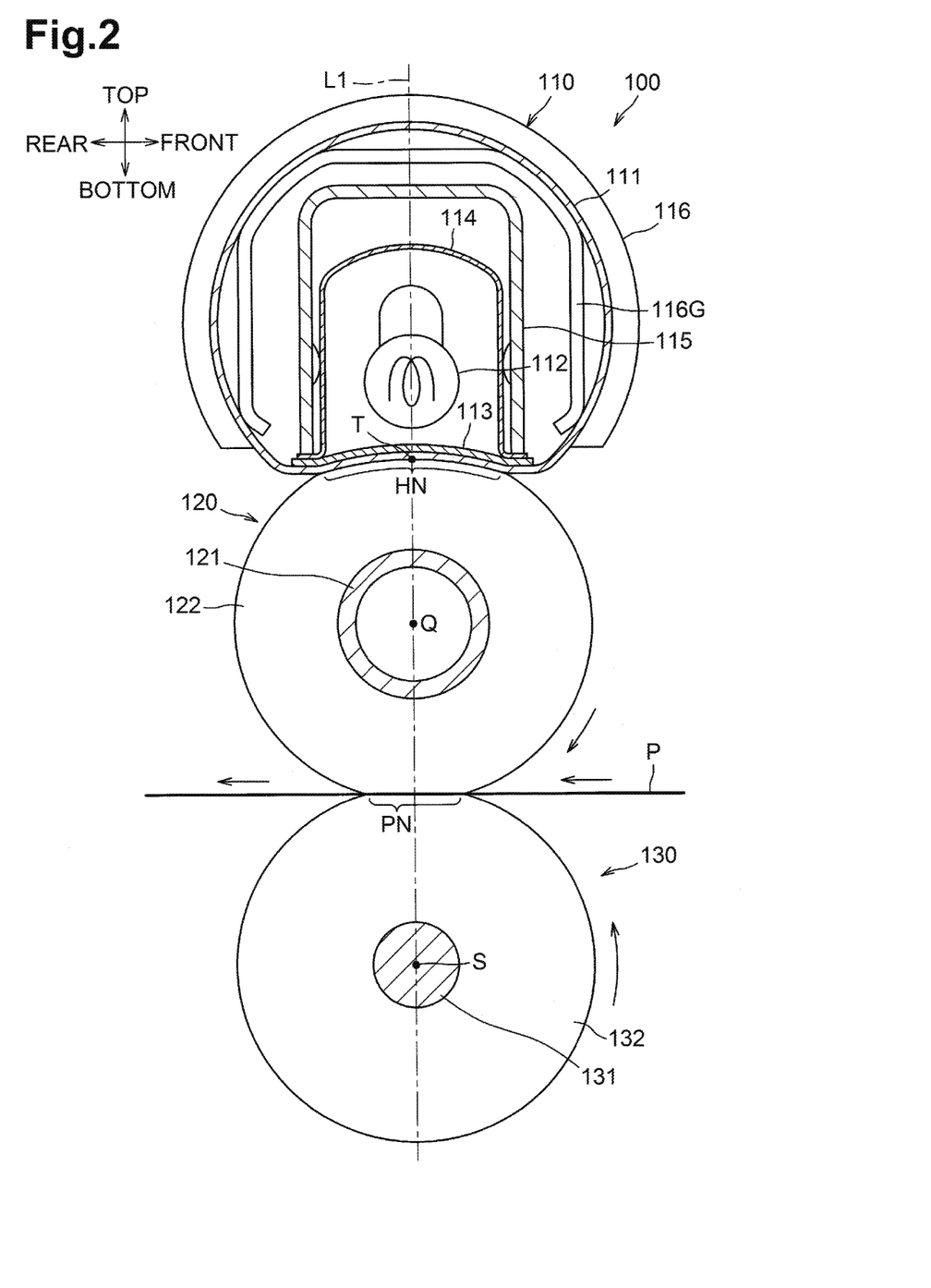
FIG. 2 is a cross-sectional view of the fixing device.

As illustrated in FIG. 2, the heating unit 110 is configured to contact the fixing roller 120 to heat the fixing roller 120, and is disposed opposite to the pressure roller 130 across the fixing roller 120. The heating unit 110 includes an endless belt 111, a halogen lamp 112, a nip plate 113, a reflection plate 114, a stay 115, and side guides 116 (only one of which is illustrated). The halogen lamp 112 is a non-limiting example of the heater recited in the appended claims.

The endless belt 111 is a seamless belt having heat resistivity and flexibility and is rotatable while being partially held between the nip plate 113 and the fixing roller 120. A heating nip HN is defined by the endless belt 111 and the fixing roller 120 in contact with each other.

The halogen lamp 112 heats the nip plate 113 and the endless belt 111 and is disposed at a predetermined distance from the nip plate 113.

The nip plate 113 is a member having a longitudinal length in the right and left directions and having a surface that makes sliding contact with the inner surface of the endless belt 111, which has a cylindrical shape. With this configuration, the nip plate 113 transfers radiant heat from the halogen lamp 112 to the fixing roller 120 through the endless belt 111. In other words, the halogen lamp 112 heats the fixing roller 120 through the nip plate 113 and the endless belt 111. A non-limiting example of material of the nip plate 113 is a metal plate such as an aluminum plate.

The reflection plate 114 is capable of reflecting heat radiated from the halogen lamp 112 toward the nip plate 113. For this purpose, the reflection plate 114 surrounds the halogen lamp 112 with a predetermined gap between the reflection plate 114 and the halogen lamp 112. With this configuration, the reflection plate 114 concentrates the radiant heat from the halogen lamp 112 to the nip plate 113, which may promote quick heating of the nip plate 113 and the endless belt 111.

The stay 115 supports a front end portion and a rear end portion of the nip plate 113 in the front and rear directions through the reflection plate 114, so as to keep the nip plate 113 rigid. The stay 115 has an approximately U-shaped cross-section and covers the halogen lamp 112 and the reflection plate 114.

Each side guide 116 guides the inner surface of the endless belt 111 using a guide 116G and restricts the movement of the endless belt 111 in the right or left direction. One of the side guides 116 is disposed at a left edge portion of the endless belt 111, and the other side guide 116 is disposed at a right edge portion of the endless belt 111. With this configuration, the side guides 116 support the halogen lamp 112, the nip plate 113, the reflection plate 114, and the stay 115.

The fixing roller 120 is disposed under the heating unit 110 and held between the heating unit 110 and the pressure roller 130. The fixing roller 120 includes a roller shaft 121 and a roller body 122. The roller shaft 121 is a hollow metal tube, and the roller body 122 is a rubber layer formed over the outer surface of the roller shaft 121. The fixing roller 120 is rotatable clockwise as illustrated in FIG. 2 by driving force from a drive, not illustrated.

The pressure roller 130 is disposed under the fixing roller 120 to convey a sheet P held between the pressure roller 130 and the fixing roller 120. The pressure roller 130 includes a pressure roller shaft 131 and a pressure roller body 132. The pressure roller shaft 131 is a solid metal bar, and the pressure roller body 132 is a rubber layer formed over the outer surface of the pressure roller shaft 131. As illustrated in FIG. 2, the pressure roller body 132 is in contact with the sheet P. The pressure roller shaft 131 has a diameter smaller than the diameter of the roller shaft 121 of the fixing roller 120. The rubber layer of the pressure roller body 132 is made of a material softer in hardness than the material of the rubber layer of the roller body 122 of the fixing roller 120. Also, the rubber layer of the pressure roller body 132 is greater in thickness than the rubber layer of the roller body 122 of the fixing roller 120. A pressure nip PN is defined by the pressure roller 130 and the fixing roller 120 in contact with each other.

The heating unit 110, the fixing roller 120, and the pressure roller 130 are aligned linearly. Specifically, the center, T, of the heating nip HN is positioned on line L1, which passes through the rotation center, Q, of the fixing roller 120 and the rotation center, S, of the pressure roller 130.

Figure 3:
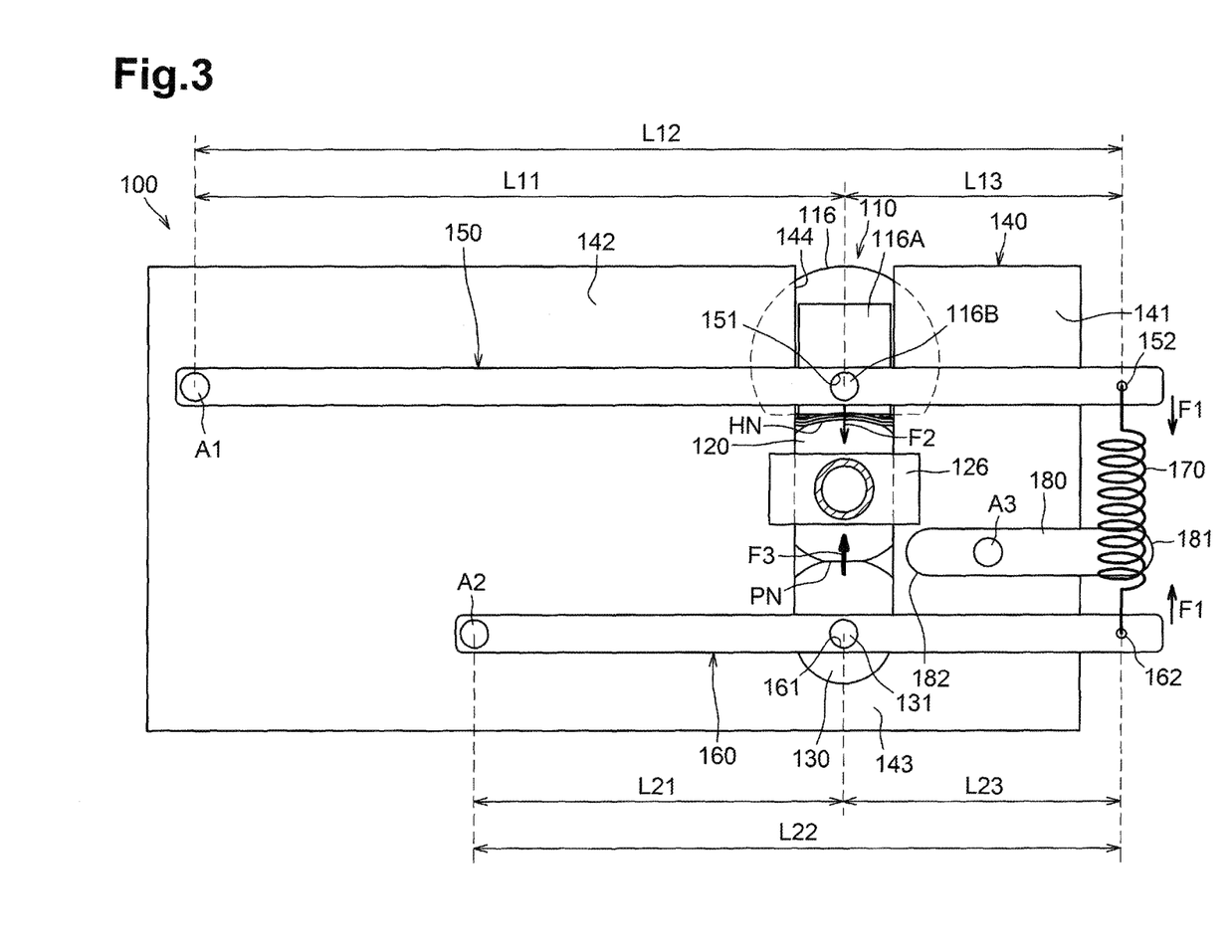
FIG. 3 illustrates elements of the fixing device such as a first arm and a second arm, with pressing forces occurring at nips.

As illustrated in FIG. 3, the fixing device 100 further includes a side frame 140, a first arm 150, a second arm 160, a tension coil spring 170, and a spacer cam 180. The side frame 140 functions as a wall. The tension coil spring 170 is a non-limiting example of the elastic member recited in the appended claims.

Although FIG. 3 illustrates the left side configuration of the fixing device 100, the fixing device 100 further includes, on the right side, elements similar to or identical with those illustrated in FIG. 3, and thus the description of the right side configuration of the fixing device 100 can be omitted for the sake of brevity. The left side frame 140 is disposed at the left sides of the heating unit 110, the fixing roller 120, and the pressure roller 130, and the right side frame is disposed at the right sides of the heating unit 110, the fixing roller 120, and the pressure roller 130. Thus, the following description will be made on the left side configuration of the fixing device 100 illustrated in FIG. 3.

The side frame 140 is a planar frame and includes a front wall 141, a rear wall 142, and a connection portion 143. The connection portion 143 connects lower end portions of the front wall 141 and the rear wall 142 to each other. The front wall 141 is spaced apart from the rear wall 142, and the front wall 141 and the rear wall 142 define a guide groove 144 therebetween. The guide groove 144 has a depth linearly extending in the top and bottom directions.

An end portion of the fixing roller 120 passes through the guide groove 144, protrudes beyond the side frame 140, and is rotatably supported by a plate 126. The plate 126 is disposed across the guide groove 144 and fixed to the front wall 141 and the rear wall 142.

The side guide 116 includes a guided portion 116A and a connection shaft 116B. The guided portion 116A is supported by the guide groove 144 movably in the top and bottom directions. The connection shaft 116B is rotatably connected to the first arm 150.

The first arm 150 is a member extending in the front and rear directions with a rear end portion of the first arm 150 supported by the rear wall 142 of the side frame 140 through a first shaft A1. Thus, the first arm 150 is pivotable about the first shaft A1. The first arm 150 includes a first pressing portion 151 and a first connection portion 152. The first pressing portion 151 is configured to press the heating unit 110 toward the fixing roller 120. The first connection portion 152 is connected with one end portion of the tension coil spring 170.

In the first embodiment, the first pressing portion 151 corresponds to an upper-half portion of the inner surface of a hole in the first arm 150 that rotatably supports the connection shaft 116B. It will be understood that the first pressing portion may have any other shape insofar as the first pressing portion is in contact with the heating unit 110 while pressing the heating unit 110 toward the fixing roller 120. For example, the first pressing portion may have a protrusion shape.

The first connection portion 152 is disposed opposite to the first shaft A1 across the first pressing portion 151. In the first embodiment, the first connection portion 152 corresponds to a lower portion of another hole in the first arm 150 that is engaged with the one end portion of the tension coil spring 170, that is, the first connection portion 152 is a portion contacting the one end portion of the tension coil spring 170. It will be understood that the first connection portion may have any other shape insofar as the first connection portion is in contact with the tension coil spring 170 while the heating unit 110 is being pressed against the fixing roller 120. For example, the first connection portion may have a protrusion shape.

An end portion of the pressure roller 130 passes through the guide groove 144, protrudes beyond the side frame 140, and is rotatably supported by the second arm 160.

The second arm 160 is a member extending in the front and rear directions with a rear end portion of the second arm 160 supported by the rear wall 142 of the side frame 140 through a second shaft A2. Thus, the second arm 160 is pivotable about the second shaft A2. The second arm 160 includes a second pressing portion 161 and a second connection portion 162. The second pressing portion 161 is configured to press the pressure roller 130 toward the fixing roller 120. The second connection portion 162 is connected with another end portion of the tension coil spring 170.

In the first embodiment, the second pressing portion 161 corresponds to a lower-half portion of the inner surface of a hole in the second arm 160 that rotatably supports the pressure roller shaft 131. It will be understood that the second pressing portion may have any other shape insofar as the second pressing portion is in contact with the pressure roller 130 while pressing the pressure roller 130 toward the fixing roller 120. For example, the second pressing portion may have a protrusion shape.

The second connection portion 162 is disposed opposite to the second shaft A2 across the second pressing portion 161. In the first embodiment, the second connection portion 162 corresponds to an upper portion of another hole in the second arm 160 that is engaged with the another end portion of the tension coil spring 170, that is, the second connection portion 162 is a portion contacting the another end portion of the tension coil spring 170. It will be understood that the second connection portion may have any other shape insofar as the second connection portion is in contact with the tension coil spring 170 while the pressure roller 130 is being pressed against the fixing roller 120. For example, the second connection portion may have a protrusion shape.

Next, description will be made with regard to relative positions of the shafts A1 and A2, the pressing portions 151 and 161, and the connection portions 152 and 162. In the following description, distances are measured based on reference points, which include the axial centers of the shafts A1 and A2 and the centers in the front and rear directions of the pressing portions 151 and 161. The same applies in a third shaft A3, described later.

The distance, L11, between the first shaft A1 and the first pressing portion 151 is greater than the distance, L21, between the second shaft A2 and the second pressing portion 161. The distance, L12, between the first shaft A1 and the first connection portion 152 is greater than the distance, L22, between the second shaft A2 and the second connection portion 162. The distance, L13, between the first pressing portion 151 and the first connection portion 152 is equal to the distance, L23, between the second pressing portion 161 and the second connection portion 162.

A second leverage ratio R2 of the distance L22 to the distance L21 (ratio L22/L21) is greater than a first leverage ratio R1 of the distance L12 to the distance L11 (ratio L12/L11). Specifically, in the first embodiment, the second leverage ratio R2 is approximately 1.2 times the first leverage ratio R1. The second leverage ratio R2 is preferably from 1.1 times to 1.8 times the first leverage ratio R1, more preferably from 1.2 times to 1.6 times the first leverage ratio R1.

The tension coil spring 170 is configured to bias the first pressing portion 151 and the second pressing portion 161 toward each other, and is connected to the first connection portion 152 of the first arm 150 and the second connection portion 162 of the second arm 160. As described above, the distance L13 between the first pressing portion 151 and the first connection portion 152 is equal to the distance L23 between the second pressing portion 161 and the second connection portion 162. Thus, the tension coil spring 170 is disposed approximately orthogonally to the first arm 150 and the second arm 160, which extend in the front and rear directions.

The spacer cam 180 is configured to press the first arm 150 and the second arm 160 away from each other. For this purpose, the spacer cam 180 is disposed between the first arm 150 and the second arm 160 and is rotatably supported by the front wall 141 of the side frame 140 through the third shaft A3. The spacer cam 180 is closer to the first connection portion 152 than to the first shaft A1 and closer to the second connection portion 162 than to the second shaft A2.

Figure 4:
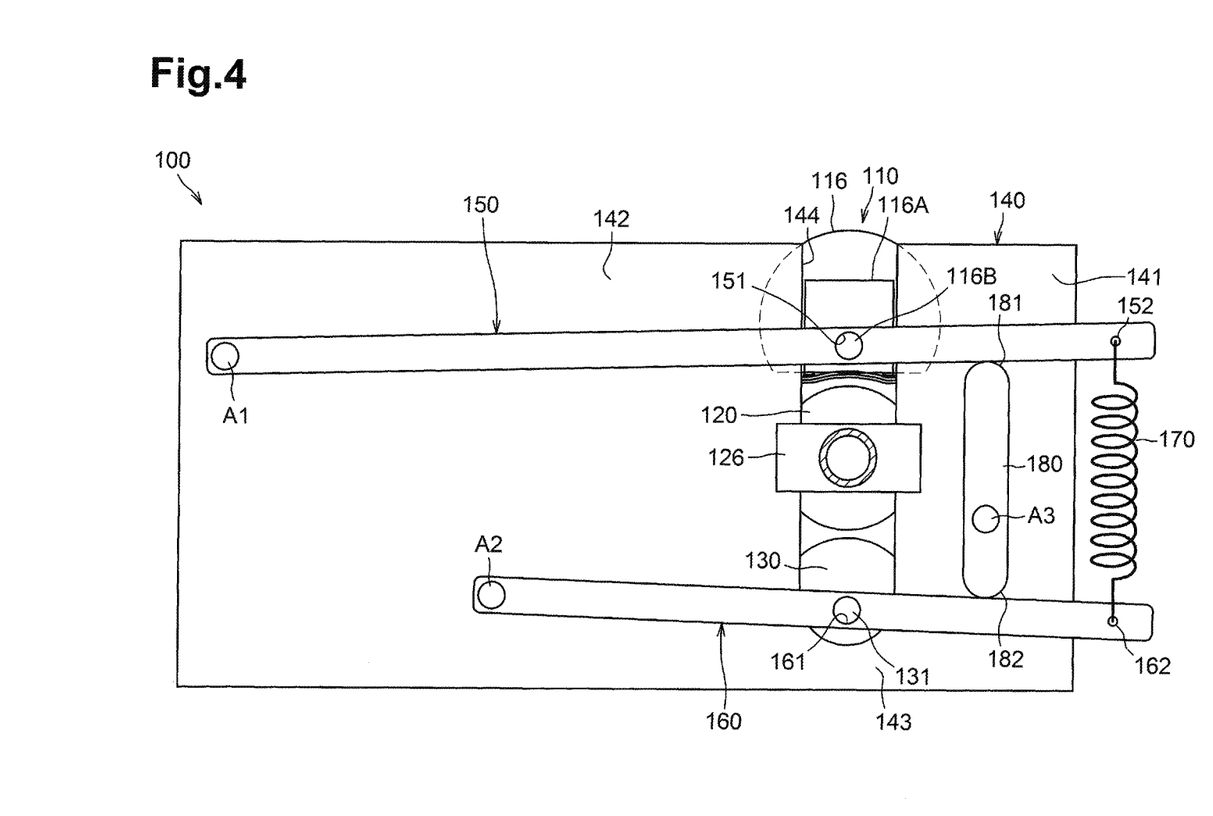
FIG. 4 illustrates elements of the fixing device such as the first arm and the second arm, with pressing forces released from the nips.

The spacer cam 180 has a longitudinal length and is rotatable to move between a first position illustrated in FIG. 3 and a second position illustrated in FIG. 4. At the first position, the spacer cam 180 extends in the front and rear directions, and at the second position, the spacer cam 180 extends in the top and bottom directions. From a drive, not illustrated, a rotational driving force of positive rotation or inverse rotation is input into the spacer cam 180. Upon input of a rotational driving force in one direction, the spacer cam 180 rotates counterclockwise as illustrated in FIGS. 3 and 4 from the first position to the second position. Upon input of a rotational driving force in another direction, the spacer cam 180 rotates clockwise as illustrated in FIGS. 3 and 4 from the second position to the first position.

The spacer cam 180 includes a first cam surface 181 and a second cam surface 182. On the first cam surface 181, the spacer cam 180 is configured to press the first arm 150. On the second cam surface 182, the spacer cam 180 is configured to press the second arm 160. In this respect, end surfaces in the longitudinal direction of the spacer cam 180 have arcuate shapes as viewed in the axial direction of the third shaft A3. The first cam surface 181 corresponds to a part of one of the arcuate end surfaces, and the second cam surface 182 corresponds to a part of the other arcuate end surface. Specifically, the first cam surface 181 contacts the first arm 150 while the spacer cam 180 rotates from the first position to the second position, and the second cam surface 182 contacts the second arm 160 while the spacer cam 180 rotates from the first position to the second position.

The third shaft A3, which is a rotation center of the spacer cam 180, is closer to the second arm 160 than to the first arm 150. The maximum distance between the third shaft A3 and the first cam surface 181 is greater than the maximum distance between the third shaft A3 and the second cam surface 182.

In other words, the maximum distance between the third shaft A3 and the first cam surface 181 is greater than the minimum distance between the third shaft A3 and the first arm 150. The maximum distance between the third shaft A3 and the second cam surface 182 is smaller than the minimum distance between the third shaft A3 and the first arm 150 and greater than the minimum distance between the third shaft A3 and the second arm 160.

As used herein, the maximum distance between the third shaft A3 and the first cam surface 181 refers to the distance between the third shaft A3 and the point of contact between the first cam surface 181 and the first arm 150 with the spacer cam 180 at the second position. Also as used herein, the minimum distance between the third shaft A3 and the first arm 150 refers to the minimum distance between the third shaft A3 and the first arm 150 with the spacer cam 180 at the first position, that is, with the spacer cam 180 not contacting the first arm 150, in other words, with no load being applied to the tension coil spring 170, which is disposed between the first arm 150 and the second arm 160.

Also as used herein, the maximum distance between the third shaft A3 and the second cam surface 182 refers to the distance between the third shaft A3 and the point of contact between the second cam surface 182 and the second arm 160 with the spacer cam 180 at the second position. Also as used herein, the minimum distance between the third shaft A3 and the second arm 160 refers to the minimum distance between the third shaft A3 and the second arm 160 with the spacer cam 180 at the first position, that is, with the spacer cam 180 not contacting the second arm 160, in other words, with no load being applied to the tension spring 170, which is disposed between the first arm 150 and the second arm 160.

Next, how the arms 150 and 160 and the spacer cam 180 operate will be described.

As illustrated in FIG. 3, with the heating unit 110 and the pressure roller 130 pressed against the fixing roller 120, biasing force F1 of the tension coil spring 170 is applied to the first arm 150 and the second arm 160. However, as the second leverage ratio R2 of the second arm 160 is greater than the first leverage ratio R1 of the first arm 150, the force F3, with which the second arm 160 is pressing the pressure roller 130, is greater than the force F2, with which the first arm 150 is pressing the heating unit 110.

When the drive is activated with a sheet P stuck at the heating nip HN or the pressure nip PN, for example, the spacer cam 180 rotates counterclockwise as illustrated in FIGS. 3 and 4 from the first position to the second position. While the spacer cam 180 rotates toward the second position, the cam surfaces 181 and 182 respectively press the arms 150 and 160 away from each other. Specifically, the first cam surface 181 contacts and presses a portion of the first arm 150 located between the first pressing portion 151 and the first connection portion 152, and the second cam surface 182 contacts and presses a portion of the second arm 160 located between the second pressing portion 161 and the second connection portion 162. As illustrated in FIG. 4, the first pressing portion 151 of the first arm 150 and the second pressing portion 161 of the second arm 160 are separated farther away from each other, resulting in releasing of the pressing forces at the nips HN and PN.

The first embodiment provides the following advantageous effects, in addition to the above-described advantageous effects.

The first leverage ratio R1 is different from the second leverage ratio R2, which allows varying of the pressing forces of the nips HN and PN. This eliminates the need for a spring dedicated to the first arm 150 and a spring dedicated to the second arm 160, preventing an increase in the number of parts required.

The second leverage ratio R2 is greater than the first leverage ratio R1, which allows increasing of the pressing force of the pressure nip PN and a nip width thereof, when compared with a configuration where the first leverage ratio R1 is equal to the second leverage ratio R2. This configuration, as a result, the heat fixing at the pressure nip PN more reliable.

As used herein, the nip width of the pressure nip PN refers to a distance over which the pressure roller 130 and the fixing roller 120 are in contact with each other in the rotation direction of the fixing roller 120. Also as used herein, the nip width of the heating nip HN refers to a distance over which the endless belt 111 and the fixing roller 120 are in contact with each other in the rotation direction of the fixing roller 120.

When compared with a configuration where the first leverage ratio R1 is equal to the second leverage ratio R2, the pressing force of the heating nip HN is relatively small, which allows reduced resistance of sliding contact between the heating unit 110 and the fixing roller 120, and reduces the difference in load between a center portion of the heating unit 110 and end portions of the heating unit 110 in the right and left directions. This configuration minimizes bending of the heating unit 110 in the right and left directions. This configuration in turn enables, for example, the nip plate 113 to be relatively thin, when compared with a configuration where the pressing force of the heating nip HN is greater, resulting in increased temperature rising efficiency.

The distance L13 between the first pressing portion 151 and the first connection portion 152 and the distance L23 between the second pressing portion 161 and the second connection portion 162 are equal to each other. This configuration allows the tension coil spring 170 to be disposed approximately orthogonal to the arms 150 and 160, improving the efficiency with which the biasing force of the tension coil spring 170 is applied to the arms 150 and 160.

The spacer cam 180 is closer to the first connection portion 152 than to the first shaft A1 and closer to the second connection portion 162 than to the second shaft A2. This configuration requires a smaller amount of driving torque for the spacer cam 180 than when, for example, the spacer cam is closer to the first shaft than to the first connection portion and closer to the second shaft than to the second connection portion. That is, with the spacer cam 180 positioned closer to the points of application, a smaller amount of driving torque is necessary for the spacer cam 180 than when, for example, the spacer cam is closer to the fulcrums.

The third shaft A3 is closer to the second arm 160 than to the first arm 150, and the maximum distance between the third shaft A3 and the first cam surface 181 is greater than the maximum distance between the third shaft A3 and the second cam surface 182. This configuration requires a smaller amount of driving torque for the spacer cam 180.

Second Embodiment

Next, the second embodiment of the present disclosure will be described in detail by referring to the accompanying drawings. In the following description of the third embodiment, which is a modification of the fixing device 100 according to the first embodiment, approximately identical components between the first and second embodiments bear the same reference numeral and will not be elaborated upon here.

Figure 5:
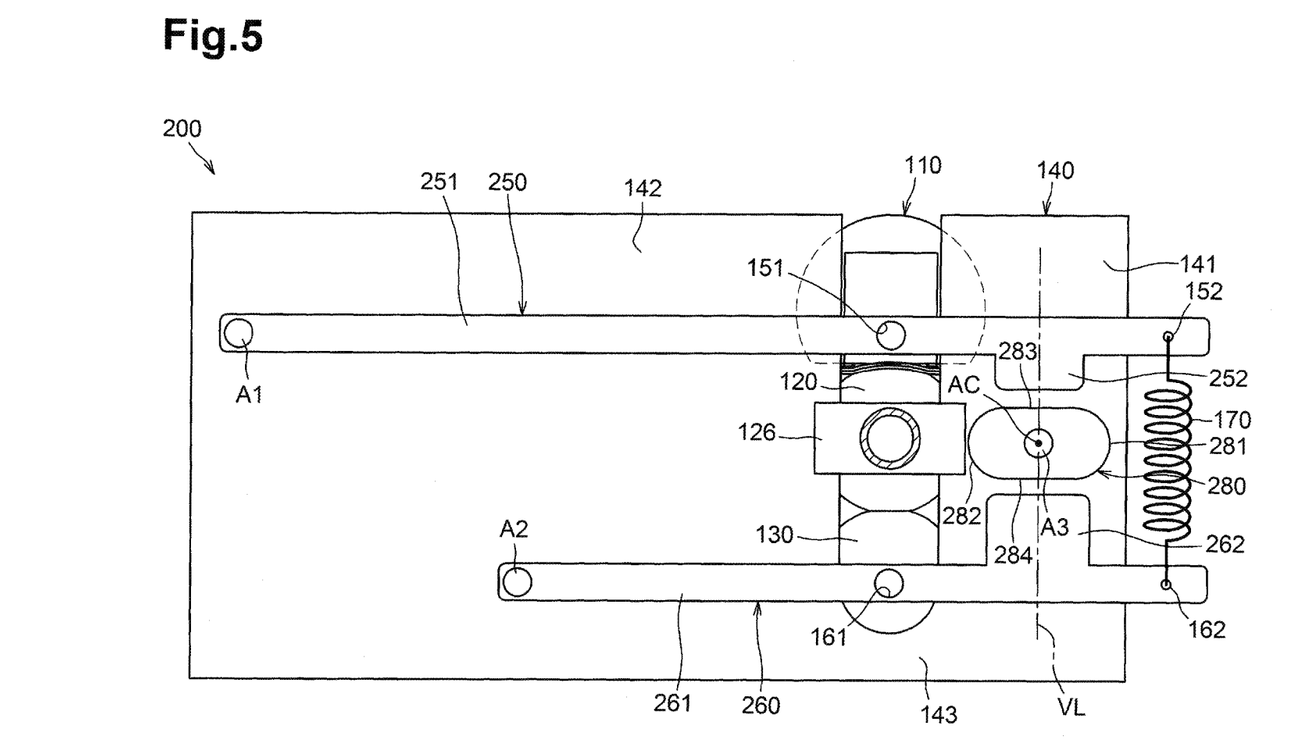
FIG. 5 illustrates a fixing device according to a second embodiment, with pressing forces occurring at the nips.

As illustrated in FIG. 5, a fixing device 200 according to the second embodiment includes a first arm 250, a second arm 260, and a spacer cam 280, which have different structures from the structures of the respective equivalents of the first embodiment.

The first arm 250 includes a first arm body 251 and a first protrusion 252. The first arm body 251 extends in the front and rear directions with a rear end portion of the first arm body 251 rotatably supported by the rear wall 142 of the side frame 140 through the first shaft A1. The first protrusion 252 protrudes from the first arm body 251 toward the spacer cam 280. The first arm body 251 includes a first pressing portion 151 and a first connection portion 152, which are identical to the respective equivalents of the first embodiment.

The second arm 260 includes a second arm body 261 and a second protrusion 262. The second arm body 261 extends in the front and rear directions, and the second protrusion 262 protrudes from the second arm body 261 toward the spacer cam 280. The protrusion amount by which the second protrusion 262 protrudes from the second arm body 261 is greater than the protrusion amount by which the first protrusion 252 protrudes from the first arm body 251. It will be understood that the protrusion amounts of the protrusions 252 and 262 can be set otherwise as desired depending on the position of the spacer cam 280. For example, the protrusion amount of the second protrusion 262 may be smaller than the protrusion amount of the first protrusion 252, or the protrusion amounts of the protrusions 252 and 262 may be equal to each other.

The second protrusion 262 faces the first protrusion 252 in the top and bottom directions across the spacer cam 280. Thus, in the second embodiment, the directions in which the first protrusion 252 and the second protrusion 262 face each other correspond to the top and bottom directions.

The spacer cam 280 is configured to press the first arm 250 and the second arm 260 away from each other, and is disposed between the first protrusion 252 and the second protrusion 262. The spacer cam 280 is rotatably supported by the front wall 141 of the side frame 140 through the third shaft A3.

The spacer cam 280 is symmetric to itself with respect to line VL, which is orthogonal to an axis AC of the rotation center of the spacer cam 280. The axis AC of the rotation center of the spacer cam 280 passes through the center of gravity of the spacer cam 280. The distance between the axis AC of the rotation center of the spacer cam 280 and the contact surface of the first protrusion 252 contacting the spacer cam 280 is equal to the distance between the axis AC of the rotation center of the spacer cam 280 and the contact surface of the second protrusion 262 contacting the spacer cam 280.

Figure 6:
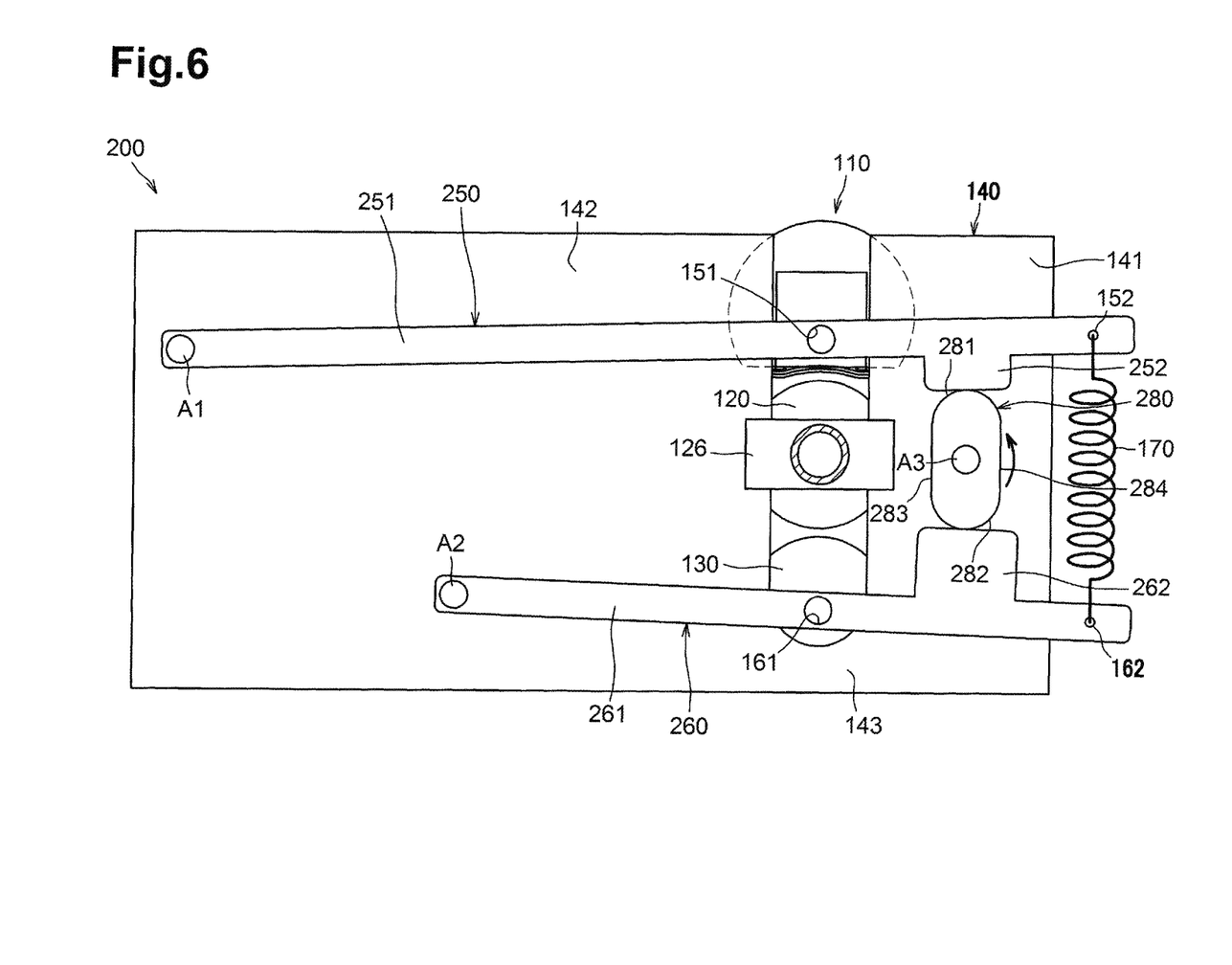
FIG. 6 illustrates the fixing device according to the second embodiment, with pressing forces released from the nips.

The spacer cam 280 is rotatable between a first position illustrated in FIG. 5 and a second position illustrated in FIG. 6. At the first position, the spacer cam 280 extends in the front and rear directions, and at the second position, the spacer cam 280 extends in the top and bottom directions. From a drive similar to the drive in the first embodiment, a rotational driving force is input into the spacer cam 280.

The maximum length of the spacer cam 280 in its longitudinal direction is smaller than the minimum distance between the arm bodies 251 and 261. As used herein, the minimum distance between the arm bodies 251 and 261 refers to the distance between the arm bodies 251 and 261 with the spacer cam 280 at the first position, that is, with the spacer cam 280 not contacting the arms 250 and 260.

The spacer cam 280 includes a first cam surface 281, a second cam surface 282, a first contact surface 283, and a second contact surface 284. On the first cam surface 281, the spacer cam 280 is configured to press the first arm 250. On the second cam surface 282, the spacer cam 280 is configured to press the second arm 260. The distance between the first cam surface 281 and the third shaft A3 is equal to the distance between the second cam surface 282 and the third shaft A3. The minimum distance between the third shaft A3 and the first protrusion 252 of the first arm 250 is equal to the minimum distance between the third shaft A3 and the second protrusion 262 of the second arm 260.

The first contact surface 283 contacts the first protrusion 252 of the first arm 250 when a first nip width between the heating unit 110 and the fixing roller 120 is equal to or greater than a first value. For example, the fixing roller 120 may degrade over time causing the first nip width to gradually increase. And when the first nip width becomes equal to or higher than the first value, the first protrusion 252 contacts the first contact surface 283 to prevent further movement of the first arm 250.

The second contact surface 284 contacts the second protrusion 262 of the second arm 260 when the second nip width between the pressure roller 130 and the fixing roller 120 becomes equal to or greater than a second value. For example, the fixing roller 120 and/or the pressure roller 130 may degrade over time causing the second nip width to gradually increase. And when the second nip width becomes equal to or higher than the second value, the second protrusion 262 contacts the second contact surface 284 to prevent further movement of the second arm 260.

The second embodiment provides the following advantageous effects.

The arms 250 and 260 are respectively provided with the protrusions 252 and 262, which protrude toward the spacer cam 280. This configuration ensures reduction in size of the spacer cam 280.

The above-described configurations associated with the spacer cam 280 (namely, its shape, the position of the axis AC of the rotation center, and the distances to the contact surfaces of the protrusions 252 and 262) ensure that when the spacer cam 280 rotates from the first position to the second position, the spacer cam 280 contacts the protrusions 252 and 262 at the same time. This causes the arms 250 and 260 to simultaneously move away from each other, enabling the heating unit 110 and the pressure roller 130 to be simultaneously released from the fixing roller 120.

The spacer cam 280 is provided with the first contact surface 283 and the second contact surface 284. The first contact surface 283 or the second contact surface 284 restricts movement of the first arm 250 or the second arm 260 when, for example, the fixing roller 120 has degraded over time causing the first arm 250 or the second arm 260 to move toward the fixing roller 120. This configuration prevents the nip width of the heating nip HN or the pressure nip PN from increasing excessively.

While in FIG. 5 the protrusion amount of the second protrusion 262 is greater than the protrusion amount of the first protrusion 252, this configuration is not intended to be construed in a limiting sense. For example, the protrusion amounts of the second protrusion 262 and the first protrusion 252 may be equal to each other, or the protrusion amount of the first protrusion 252 may be greater than the protrusion amount of the second protrusion 262.

Also in the second embodiment, the distance between the third shaft A3 and the first cam surface 281 and the distance between the third shaft A3 and the second cam surface 282 are equal to each other. This configuration enables use of a drive dedicated to rotational driving in one direction alone, resulting in reduction of drive-associated costs. In this case, the first cam surface also functions as the second cam surface, and the second cam surface also functions as the first cam surface.

Third Embodiment

Next, the third embodiment of the present disclosure will be described in detail by referring to the accompanying drawings. In the following description of the third embodiment, which is a modification of the fixing device 100 according to the first embodiment, approximately identical components between the first and third embodiments bear the same reference numeral and will not be elaborated upon here.

Figure 7:
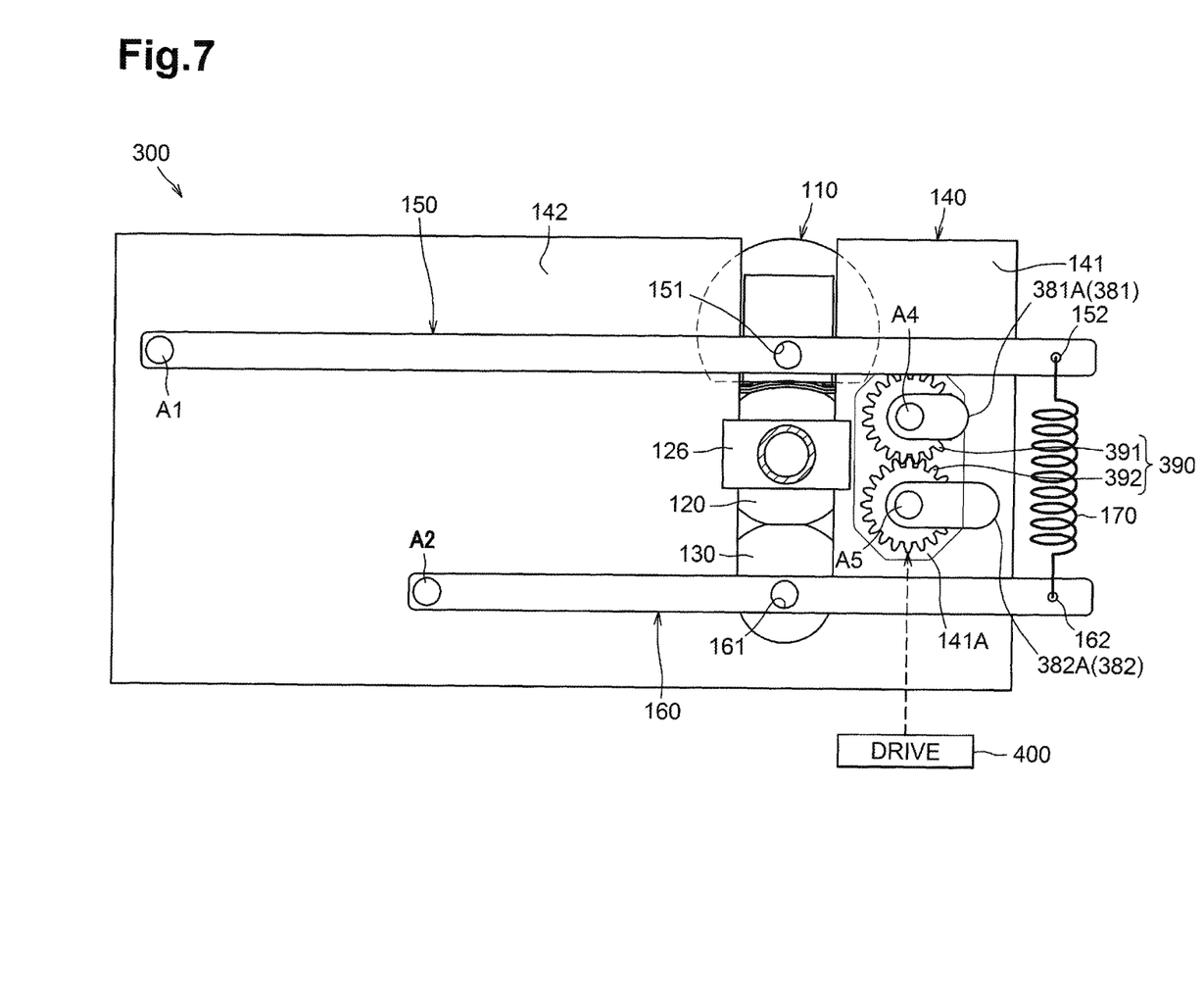
FIG. 7 illustrates a fixing device according to a third embodiment, with pressing forces occurring at the nips.

As illustrated in FIG. 7, a fixing device 300 according to third embodiment includes a first spacer cam 381, a second spacer cam 382, and a transfer mechanism 390.

The first spacer cam 381 is a cam configured to press the first arm 150 away from the second arm 160. For this purpose, the first spacer cam 381 is disposed between the first arm 150 and the second arm 160; specifically, the first spacer cam 381 is disposed between the first arm 150 and the second spacer cam 382.

One end portion of the first spacer cam 381 is rotatably supported by the front wall 141 of the side frame 140 through a fourth shaft A4. At another end portion of the first spacer cam 381, a first cam surface 381A is disposed. On the first cam surface 381A, the first spacer cam 381 is configured to press the first arm 150.

The second spacer cam 382 is a cam configured to press the second arm 160 away from the first arm 150. For this purpose, the second spacer cam 382 is disposed between the first arm 150 and the second arm 160; specifically, the second spacer cam 382 is disposed between the second arm 160 and the first spacer cam 381.

One end portion of the second spacer cam 382 is rotatably supported by the front wall 141 of the side frame 140 through a fifth shaft A5. At another end portion of the second spacer cam 382, a second cam surface 382A is disposed. On the second cam surface 382A, the first spacer cam 381 is configured to press the second arm 160.

The distance between the fifth shaft A5 and the second cam surface 382A is greater than the distance between the fourth shaft A4 and the first cam surface 381A. It will be understood that depending on the size of the cams and/or the positions of the rotation centers of the cams, the distance between the rotation center of the one cam and its cam surface and the distance between the rotation center of the other cam and its cam surface may be equal to each other or may be related to each other in an opposite way to the third embodiment.

The transfer mechanism 390 is configured to transfer driving force from a single drive 400 to the first spacer cam 381 and the second spacer cam 382. A non-limiting example of the drive 400 is a motor.

The transfer mechanism 390 includes a first gear 391 and a second gear 392. The first gear 391 rotates integrally with the first spacer cam 381, and the second gear 392 rotates integrally with the second spacer cam 382. Specifically, the first gear 391 and the first spacer cam 381 are fixed to each other and rotatable about the fourth shaft A4.

The second gear 392 is a driving gear to receive the driving force input from the drive 400, and is coaxial to the shaft of the rotation center of the second spacer cam 382. The second gear 392 and the second spacer cam 382 are fixed to each other and rotatable about the fifth shaft A5.

The second gear 392 is meshed with the first gear 391. The driving force that the second gear 392 receives from the drive 400 drives the second gear 392 into positive or inverse rotation. The gears 391 and 392 are disposed in a depression 141A of the front wall 141, so that the gears 391 and 392 are disposed inwardly than the arms 150 and 160 in the right and left directions.

Figure 8:
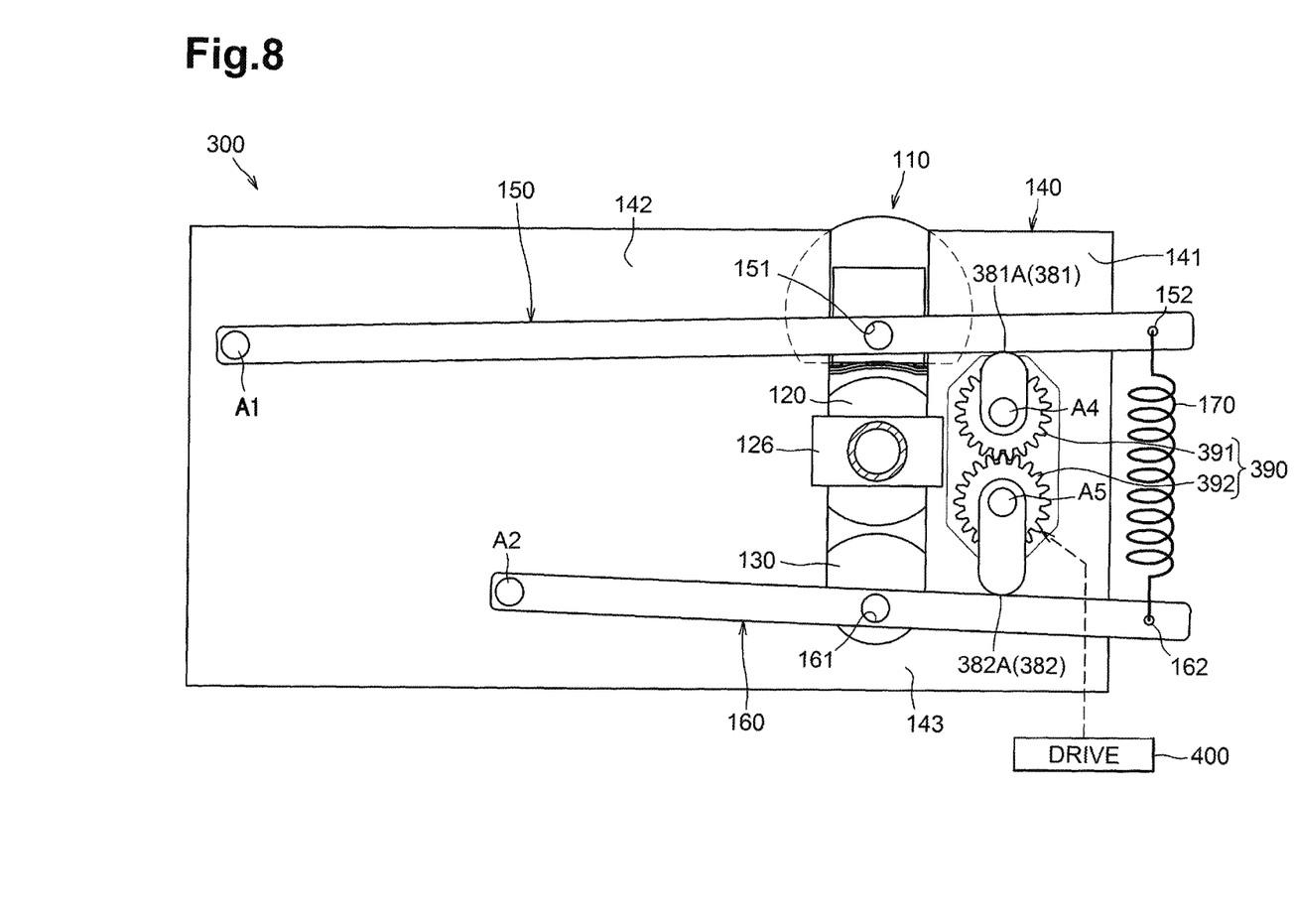
FIG. 8 illustrates the fixing device according to the third embodiment, with pressing forces released from the nips.

The first spacer cam 381 is rotatable between a first position illustrated in FIG. 7 and a second position illustrated in FIG. 8. At the first position, the first spacer cam 381 extends in the front direction from the fourth shaft A4. At the second position, the first spacer cam 381 extends in the top direction from the fourth shaft A4.

The second spacer cam 382 is rotatable between a third position illustrated in FIG. 7 and a fourth position illustrated in FIG. 8. At the third position, the second spacer cam 382 extends in the front direction from the fifth shaft A5. At the fourth position, the second spacer cam 382 extends in the bottom direction from the fifth shaft A5.

Upon input of a rotational driving force in one direction into the second gear 392 from the drive 400 with the first spacer cam 381 at the first position and the second spacer cam 382 at the third position, the second gear 392 and the second spacer cam 382 rotate integrally with each other in the clockwise direction as illustrated in FIG. 8, causing the second spacer cam 382 to rotate to the fourth position. At the same time, the first gear 391, which is meshed with the second gear 392, rotates counterclockwise as illustrated in FIG. 8. This causes the first gear 391 and the first spacer cam 381 to rotate integrally with each other in the counterclockwise direction as illustrated in FIG. 8, causing the first spacer cam 381 to rotate to the second position. In order to cause the spacer cams 381 and 382 to return respectively to the first position and the third position, the drive 400 inputs into the second gear 392 a rotational driving force in the other direction. This causes the spacer cams 381 and 382 to rotate in opposite directions to the above-described directions so as to return respectively to the first position and the third position.

The third embodiment provides the following advantageous effects.

The drive 400 alone is used to move the spacer cams 381 and 382. This configuration prevents an increase in the number of parts required, when compared with a configuration where, for example, two drives are used to move the spacer cams.

The first gear 391, which is rotatable integrally with the first spacer cam 381, is meshed with the second gear 392, which is rotatable integrally with the second spacer cam 382. This configuration simplifies the transfer mechanism 390, when compared with a configuration where, for example, the first gear and the second gear are spaced apart from each other and meshed with respective additional gears.

While the present disclosure has been described with reference to illustrative embodiments, this description is not intended to be construed in a limiting sense. Various modifications and combinations of the illustrative embodiments will be apparent to persons skilled in the art upon reference to the description.

In the above-described embodiments, the second leverage ratio R2 is greater than the first leverage ratio R1. This configuration, however, is not intended to be construed in a limiting sense. The first leverage ratio R1 may be greater than the second leverage ratio R2 or may be somewhat different from the second leverage ratio R2.

In the above-described embodiments, the heating unit 110 and the pressure roller 130 are both detached from the fixing roller 120 upon release of the pressing force. This configuration, however, is not intended to be construed in a limiting sense. The heating unit 110 and the pressure roller 130 may contact the fixing roller 120 even though the pressing force has been released, insofar as the pressures of the heating nip and the pressure nip can be adjusted by operating the spacer cam(s).

In the above-described embodiments, the heating unit 110 corresponds to the first pressure structure recited in the appended claims, the pressure roller 130 corresponds to the second pressure structure recited in the appended claims, and the fixing roller 120 corresponds to the fixing member recited in the appended claims. This configuration, however, is not intended to be construed in a limiting sense. For example, the first pressure structure may be implemented by the first pressure roller, the second pressure structure may be implemented by the second pressure roller, and the fixing member may be implemented by a heating roller provided with an internal heater. For further example, heaters may be provided respectively in the first pressure roller, the second pressure roller, and the fixing member.

In the first embodiment, the spacer cam 180 is configured to press a portion of the first arm 150 between the pressing portion 151 and the connection portion 152 and a portion of the second arm 160 between the pressing portion 161 and the connection portion 162. This configuration, however, is not intended to be construed in a limiting sense. For example, when the connection portions are positioned at a distance from end portions of the arms (in other words, when the connection portions are positioned at other than end portions of the arms), the spacer cams may press portions of the arms opposite to the connection portions across the pressing portions.

In the above-described embodiments, the tension coil spring 170 corresponds to the elastic member recited in the appended claims. This configuration, however, is not intended to be construed in a limiting sense. Other examples of the elastic member include, but are not limited to, a torsion spring and a flat spring. Another non-limiting example of the elastic member is a compression coil spring, which can be used to press the first connection portion and the second connection portion away from each other in such an application that the first and second arms cross each other with the first connection portion at a lower position and the second connection portion at an upper position in the top and bottom directions, as opposed to the above-described embodiments.

In the above-described embodiments, the halogen lamp 112 corresponds to the heater recited in the appended claims. This configuration, however, is not intended to be construed in a limiting sense. Another non-limiting example of the heater is a carbon heater, which may directly contact the inner surface of the endless belt 111. In the case of a carbon heater, it is not necessary to use the nip plate 113 and/or the reflection plate 114.

In the above-described embodiments, the heating unit 110 with the halogen lamp 112 disposed on the inside of the endless belt 111 corresponds to the heating member recited in the appended claims. This configuration, however, is not intended to be construed in a limiting sense. For example, the heating member may be a heating roller provided with a heater such as a halogen lamp in a hollow cylindrical metal member. For further example, the heating member may be provided with a heater on the outside of a metal member such as an endless belt and a hollow cylinder.

The rotation axes of the arms, the pressing portions, the connection portions, and other elements may be positioned and/or distanced from each other in any other manner than in the above-described embodiments.

In the above-described embodiments, examples of the sheet P, which corresponds to the sheet recited in the appended claims, include a thick paper, a postcard, and a thin paper. This configuration, however, is not intended to be construed in a limiting sense. Another non-limiting example of the sheet is an overhead projector (OHP) sheet.

In the above-described embodiments, the heating unit 110, the fixing roller 120, and the pressure roller 130 are aligned in series with each other. The heating unit 110, the fixing roller 120, and the pressure roller 130, however, may not necessarily be aligned in series with each other. For example, the center T of the heating nip HN may be displaced from the line L1 to the downstream side in the rotation direction of the fixing roller 120.

In the above-described embodiments, the pressure roller 130 corresponds to the pressure member recited in the appended claims. This configuration, however, is not intended to be construed in a limiting sense. Another non-limiting example of the pressure member is a non-rotatable pressure pad.

The elements described in the above-described embodiments and modifications may be combined in any manner deemed suitable.

Any relative terms or terms of degree that used herein, such as "equal", "same", "identical", "orthogonal", "approximately", and the like, should be interpreted to broadly encompass any relevant disclosed embodiments as well as such ranges or variations as would be understood by a person of ordinary skill in the art in view of the entirety of the present disclosure, such as to encompass ordinary manufacturing tolerance variations and the like.

While the features herein have been described in connection with various example structures and illustrative aspects, it will be understood by those skilled in the art that other variations and modifications of the structures and aspects described above may be made without departing from the scope of the disclosure described herein. Other structures and aspects will be apparent to those skilled in the art from a consideration of the specification or practice of the features disclosed herein. It is intended that the specification and the described examples only are illustrative with the true scope of the disclosure being defined by the following claims.

What is claimed is:

1. A fixing device comprising:
a first pressure structure;
a second pressure structure;
a fixing member disposed between the first pressure structure and the second pressure structure;
a heater configured to heat the fixing member;
a first arm pivotable about a first shaft and including:
    a first pressing portion configured to press the first pressure structure toward the fixing member; and
    a first connection portion disposed opposite to the first shaft across the first pressing portion;
a second arm pivotable about a second shaft and including:
    a second pressing portion configured to press the second pressure structure toward the fixing member; and
    a second connection portion disposed opposite to the second shaft across the second pressing portion; and
an elastic member connected to the first connection portion and the second connection portion and configured to bias the first pressing portion and the second pressing portion toward each other,
wherein a first leverage ratio of a distance between the first shaft and the first connection portion to a distance between the first shaft and the first pressing portion is different from a second leverage ratio of a distance between the second shaft and the second connection portion to a distance between the second shaft and the second pressing portion.

2. The fixing device according to claim 1,
wherein the first pressure structure comprises a heating member including the heater,
wherein the second pressure structure comprises a pressure member configured to convey a sheet between the pressure member and the fixing member, and
wherein the second leverage ratio is greater than the first leverage ratio.

3. The fixing device according to claim 2, wherein the distance between the first shaft and the first pressing portion is greater than the distance between the second shaft and the second pressing portion.

4. The fixing device according to claim 2, wherein a distance between the first pressing portion and the first connection portion is equal to a distance between the second pressing portion and the second connection portion.

5. The fixing device according to claim 2, further comprising a cam disposed between the first arm and the second arm and rotatable to press the first arm and the second arm away from each other, wherein the cam is closer to the first connection portion than to the first shaft and closer to the second connection portion than to the second shaft.

6. The fixing device according to claim 2, further comprising a cam rotatably disposed between the first arm and the second arm, the cam including:
a first cam surface on which the cam is configured to press the first arm; and
a second cam surface on which the cam is configured to press the second arm,
wherein a rotation center of the cam is closer to the second arm than to the first arm,
wherein a maximum distance between the rotation center of the cam and the first cam surface is greater than a minimum distance between the rotation center and the first arm, and
wherein a maximum distance between the rotation center of the cam and the second cam surface is smaller than the minimum distance between the rotation center and the first arm and greater than a minimum distance between the rotation center and the second arm.

7. The fixing device according to claim 2, further comprising a cam disposed between the first arm and the second arm and rotatable to press the first arm and the second arm away from each other, wherein a minimum distance between a rotation center of the cam and the first arm is equal to a minimum distance between the rotation center of the cam and the second arm.

8. The fixing device according to claim 7,
wherein the first arm includes a first protrusion protruding toward the cam, and
wherein the second arm includes a second protrusion protruding toward the cam.

9. The fixing device according to claim 8,
wherein the cam is symmetric to itself with respect to a line orthogonal to an axis of the rotation center of the cam,
wherein the axis of the rotation center of the cam passes through a center of gravity of the cam, and
wherein a distance between the axis of the rotation center of the cam and a contact surface of the first protrusion to contact the cam is equal to a distance between the axis of the rotation center of the cam and a contact surface of the second protrusion to contact the cam.

10. The fixing device according to claim 7, wherein the cam includes
   a first contact surface to contact the first arm when a first nip width between the first pressure structure and the fixing member becomes equal to or greater than a first value, and
   a second contact surface to contact the second arm when a second nip width between the second pressure structure and the fixing member becomes equal to or greater than a second value.

11. The fixing device according to claim 2, further comprising:
   a first cam disposed between the first arm and the second arm and configured to press the first arm away from the second arm;
   a second cam disposed between the first arm and the second arm and configured to press the second arm away from the first arm; and
   a transfer mechanism configured to transfer a driving force from a single drive to the first cam and the second cam.

12. The fixing device according to claim 11, wherein the transfer mechanism includes
   a first gear configured to rotate integrally with the first cam, and
   a second gear meshed with the first gear and configured to rotate integrally with the second cam.

* * * * *